June 2, 1931.   E. BELIN   1,807,889
MECHANICAL MOVEMENT
Filed Dec. 17, 1928   3 Sheets-Sheet 2

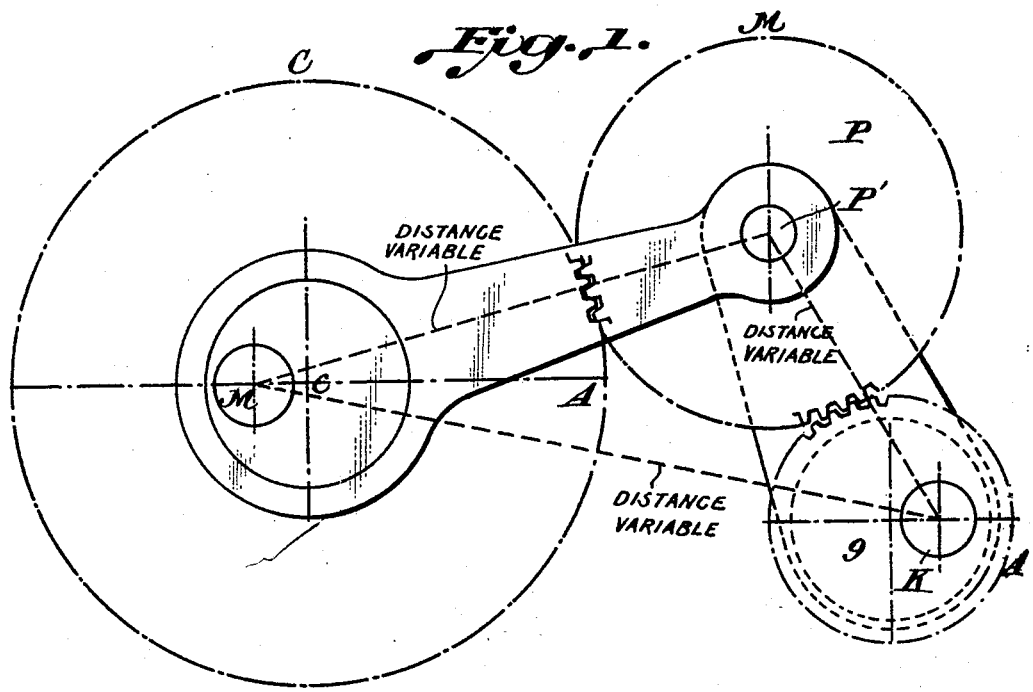
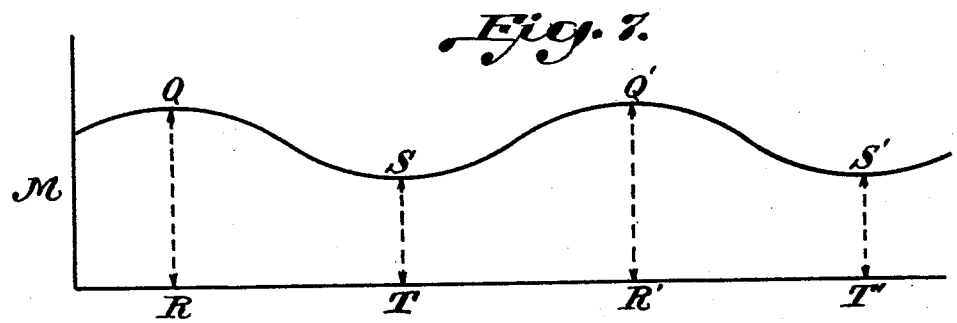
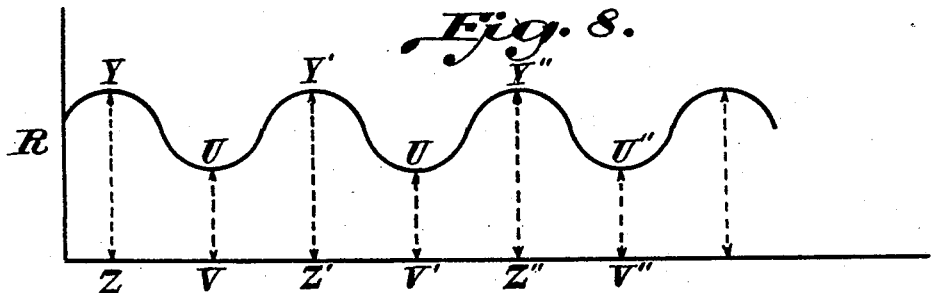

Inventor,
Edouard Belin,
By Emil Bonnelycke Atty.

June 2, 1931.  E. BELIN  1,807,889

MECHANICAL MOVEMENT

Filed Dec. 17, 1928   3 Sheets-Sheet 3

Inventor,
Edouard Belin,
By Emil Bonnelycke Atty.

Patented June 2, 1931

1,807,889

UNITED STATES PATENT OFFICE

EDOUARD BELIN, OF PARIS, FRANCE

MECHANICAL MOVEMENT

Application filed December 17, 1928, Serial No. 326,555, and in France January 26, 1928.

The problem which my invention aims to solve is to ensure a variable speed of rotation of a shaft driven by an arbor turning at constant speed. Among other things, it is necessary that the conditions of speed variation be capable of modification with the greatest facility and security. In any event, no wear or play which could give way to retarding effects, however slight they may be, must be introduced, by reason of alternating movement or stresses.

The arrangement is characterized by the use of eccentric pinions disposed on the driving shafts and driven by the interposition of a pinion which is free to become displaced in its plane.

Figure 3:
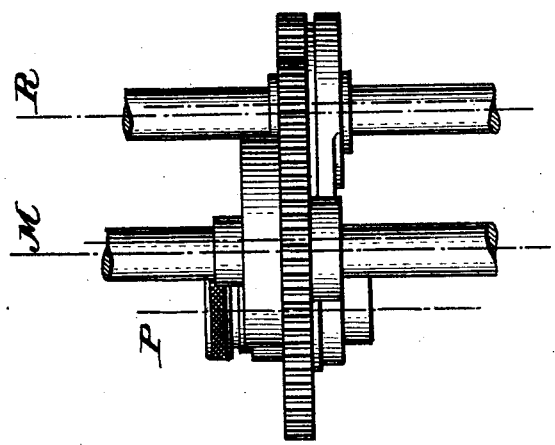
Figure 2:
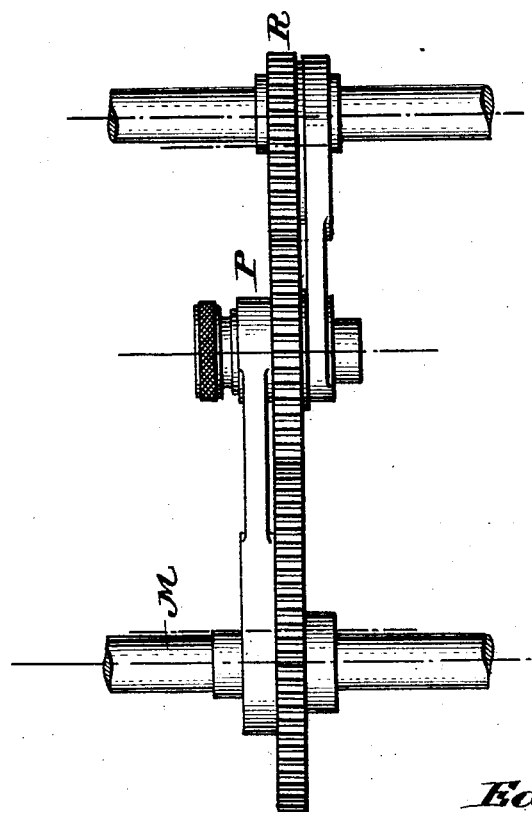
Figure 4:
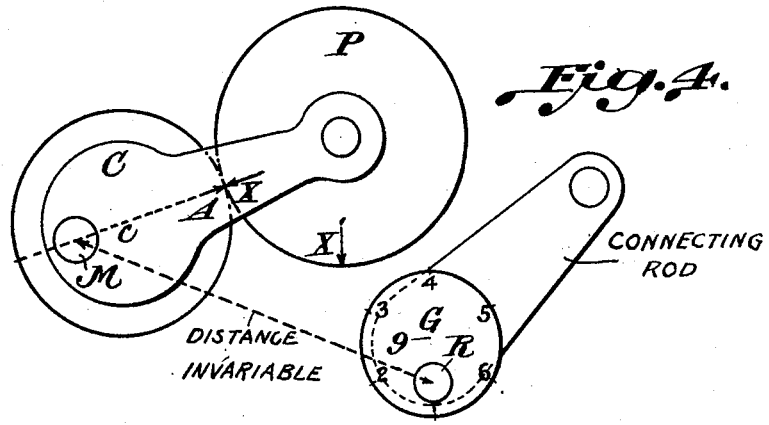
Figure 5:
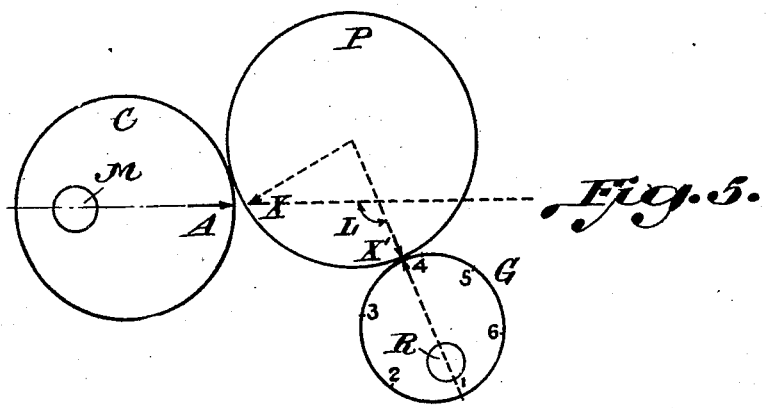
Figure 6:
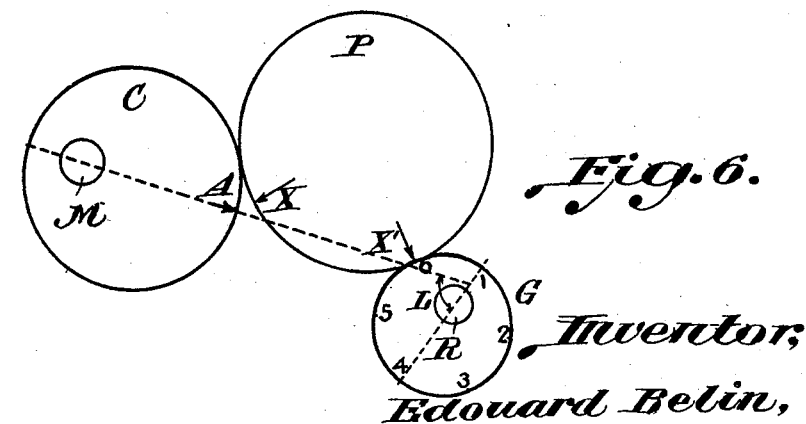

The accompanying drawings illustrate the principles of my invention. Figure 1 shows in outline form a plan of my mechanism for insuring a variable speed of a shaft driven by an arbor turning at constant speed. Fig. 2 shows a top view of the mechanism shown in Fig. 1. Fig. 3 shows a top view similar to Fig. 2 but with the gears in a different position. Figs. 4, 5 and 6 are schematic plan views showing the positions of the three gear wheels and the shafts on which they are mounted during the variation in the change of speed between the driving and the driven shafts.

As shown in said drawings, a central pinion C is driven by the driving shaft M whereon it is eccentrically mounted. In the rotation of the shaft M, which is at constant speed, the center of the pinion will describe a circle $C_1$, $C_2$ about the axis of shaft M. The pinion G drives the driven shaft R on which it is eccentrically mounted; and during its rotation, the center of said pinion G describes a circle $g_1$, $g_2$ about R the axis of shaft.

An intermediate pinion P, centrally mounted on its shaft P', is adapted to mesh with the teeth of pinions C and G. The circle described by said pinion P in its rotation is tangent to the two preceding ones and the center thereof is at $P_1$ or $P_2$.

It will be obvious that according to the ratio of the radii of the pinions C G, of the teeth and the distances of eccentricity MC and RG, the rotation of shaft R will be controlled with a speed which is variable, a function of these parameters and that the periodicity of this variation will also be a function of said parameters.

In addition, I may vary the conditions of movement by varying the angle $\alpha$ formed by the lines joining the shafts M R fixed at the centers of pinions C G. Hence, from a predetermined position of the line $RG_1$ in the plane of pinion G, I can fix the values of angle $\alpha$ by index marks, for example; the intersection of the line MR with the circumference of pinion C, giving the possibility of obtaining for an instant and during a predetermined time a certain law of variations of the rotation of pinion G. By changing the index mark I obtain another law.

This permits modifying under infinite conditions, so to speak, the law of variations of the rotation of pinion G for a speed of rotation given to pinion C. The pinion P becomes displaced in its plane. It is merely necessary to ensure its engagement with the two others by means of a spring or by gravity.

It will be noticed that for a direction of rotation of C, the stresses on the teeth of pinions P and C and of pinion G are always in the same direction, whatever be the range of rotation of pinion G with respect to pinion C, which is the principal point for assuring permanency of the value of the solution to the problem hereinbefore pointed out.

Figures 4, 5 and 6 show a connecting rod, carrying an eccentric G of the same throw or eccentricity as that of the eccentric C, mounted on the rotatable shaft of the pinion, while the other end of the pitman provides a bearing in which the shaft of the concentric pinion P is journalled.

When the eccentric pinion C is turned, the connecting rod reciprocates to move the pinion P outwardly and inwardly relative to M. This pinion P is connected in a similar fashion also to the eccentrically mounted pinion G. This manner of mounting the gears fixes the relative positions of shafts M and R, making the distance therebetween invariable, but mounts the shaft P' for relative movement to shafts M and R to make the distances M P' and R P' variable. A system of springs in place of the eccentrics and connecting rods could be utilized, if desired, to maintain the gears in engagement.

This arrangement permits the variation in the change of speed between the driving and the driven shafts to be adjusted. For instance, if the gear C has uniform movement, the gear P which is turning therewith will have a periodically varying movement during which time the distance from the fixed shaft M will vary continuously going from a maximum to a minimum. The linear speed of the pinion P will take on the form of the curve shown in Figure 2 of the graph and for each turn of shaft M the speed Q R will equal Q' R'=Q" R", etc., and in the same way S T will equal S' T'=S" T", etc.

Now, if it is supposed that pinion P is turning with a uniform speed, the pinion G which it drives will be driven with a variable speed. In this case the linear speed of G will take the form of the curve shown in Figure 3, in which for each turn of pinion G there will be times at which U V will equal U' V', etc., and Y Z will equal Y' Z', etc.

Thus, if shaft G is driven by shafts M and R through the eccentric gears thereon and the intermediate pinion P, the resultant speed of R will be given by the algebraic sum of the two curves. It is only necessary then to so proportion the diameter of the wheels C and G to have any desired cycle of movement, that is to have the gears go through a smaller or a greater number of turns before reaching the points at which they start. To show the rate of variation in the speed of the driven member may be varied by an operator, attention is directed to Figures 4 to 6.

In Figure 4, the pinion C has a mark A constituting the extremity of a line passing through the center of the pinion and through its axis of rotation. It is unimportant whether this line takes this position or some other suitable position.

The pinion P carries two marks X and X' which are radially extended. The pinion G is divided into a certain number of sectors, in this case shown as six sectors numbered from 1 to 6 inclusive.

As shown in Figure 4 the mark A on pinion C is brought into coincidence with or rather in opposite position to the mark X on the gear P. This may be accomplished by elevating the gear P above the gear G on disconnection of the connecting rod between these gears as shown clearly in said figure.

The operator then turns pinion G to a desired number as 4 and brings the same into coincidence with X' moving A and X out of opposition to one another, if necessary, as shown in Figure 5. The numeral 6 may be placed opposite X, if desired also, and A and X will still be opposite one another.

It is thus seen that a great number of combinations may be arrived at to vary the speed of the driven shaft. Thus, a number of changes of the single relative position occupied by the gears C G and P when points A and X are brought into opposition with one another may be accomplished, as each tooth of the wheel G is located at a different distance from the axis of rotation of the gear G, so that the distance between said axis of rotation and the point of tangency of gears P and G can be varied to consequently vary the speed of rotation of said shaft.

If lines are traced through the center of each eccentrically mounted pinion and its axis of rotation, respectively, an angle α will be formed by the intersection of these two lines, which is variable in accordance with the size of the divisions marked off by the lines which divide the pinion G into sectors. One is able then to use the angle α to determine the position to be occupied by the gear G with respect to the gear C.

Having thus described my invention, what I claim as new and desire to secure by Letters Patent is:

1. A mechanical movement comprising, in combination, a driving shaft, an eccentric pinion on said driving shaft, a driven shaft, an eccentric pinion on said driven shaft, a centrally mounted pinion interconnecting said eccentric pinions, said interconnecting pinion being freely displaceable edgewise in its own plane during the rotation of the driving pinion.

2. A mechanical movement comprising, in combination, a driving shaft rotating at a constant speed, a driven shaft rotatable at a variable speed, a circular pinion eccentrically mounted on each of said shafts, and an intermediate circular pinion located between and meshing with the two eccentric pinions and occupying a common plane therewith, and means for maintaining said intermediate pinion in engagement with said circular pinion throughout the movements.

3. A mechanical movement comprising, in combination, a driving shaft rotating at a constant speed, a driven shaft rotatable at a variable speed, a circular pinion eccentrically mounted on each of said shafts, a transmission pinion interposed between the two eccentric pinions, and means for varying the law of variation of the transmission.

4. A mechanical movement comprising, in combination, a driving shaft rotating at a constant speed, a driven shaft rotatable at a variable speed, a circular pinion eccentrically mounted on each of said shafts, a transmission pinion interposed between the two eccentric pinions, and means for varying the distance between said shafts and thereby the law of variation of the transmission.

5. A mechanical movement comprising, in combination, a driving shaft rotating at a constant speed, a driven shaft rotatable at a variable speed, a circular pinion eccentrically mounted on each of said shafts, and an intermediate circular pinion located between and meshing with the two eccentric pinions and occupying a common plane therewith, and means for maintaining said intermediate pinion in engagement with said circular pinions throughout their movements, said means being adapted to move said intermediate member in two directions of motion.

In testimony whereof I hereunto affix my signature.

EDOUARD BELIN.